(12) United States Patent
Zaid et al.

(10) Patent No.: US 7,407,687 B2
(45) Date of Patent: Aug. 5, 2008

(54) METHOD OF SEQUENTIALLY FORMING ANTI-CORROSIVE COATINGS

(75) Inventors: Gene H. Zaid, Sterling, KS (US); Nader M. Obeid, Riyadh (SA); James C. Baker, Halcomb, KS (US); Harlan G. McCormack, Williston, ND (US)

(73) Assignee: Jacam Chemicals, LLC, Sterling, KS (US)

( * ) Notice: Subject to any disclaimer, the term of this patent is extended or adjusted under 35 U.S.C. 154(b) by 242 days.

(21) Appl. No.: 11/330,510

(22) Filed: Jan. 12, 2006

(65) Prior Publication Data

US 2007/0160755 A1    Jul. 12, 2007

(51) Int. Cl.
*B05D 7/22* (2006.01)

(52) U.S. Cl. .................. 427/230; 427/239; 427/301; 427/333; 427/340

(58) Field of Classification Search ................ None
See application file for complete search history.

(56) References Cited

U.S. PATENT DOCUMENTS

| | | | | | |
|---|---|---|---|---|---|
| 3,108,012 | A | * | 10/1963 | Curtis | 427/238 |
| 4,713,184 | A | * | 12/1987 | Zaid | 507/236 |
| 5,936,059 | A | * | 8/1999 | Zaid | 528/421 |
| 5,945,164 | A | * | 8/1999 | Zaid | 427/333 |

* cited by examiner

*Primary Examiner*—William Phillip Fletcher, III
(74) *Attorney, Agent, or Firm*—Hovey Williams LLP

(57) ABSTRACT

Improved methods for the anti-corrosion treatment of oil or gas recovery or conveying equipment, wherein the individual components of an epoxy/curing agent anti-corrosion system are sequentially applied. Preferably, a liquid epoxy dispersion is first contacted with metal surfaces to be treated, followed after a period of time by a liquid curing agent dispersion.

30 Claims, 2 Drawing Sheets

METHOD OF SEQUENTIALLY FORMING ANTI-CORROSIVE COATINGS

BACKGROUND OF THE INVENTION

1. Field of the Invention

The present invention is broadly concerned with improved methods for treating metallic surfaces with epoxy/curing agent anti-corrosion systems. More particularly, the invention is concerned with such methods wherein the respective epoxy and curing agent system components are separately and sequentially contacted with the metal surfaces of oil or gas recovery or conveying equipment. The invention is particularly advantageous in that it permits long gas pipelines or deep producing wells to be successfully treated with anti-corrosion systems.

2. Description of the Prior Art

It is well known that oil and gas wells are subject to extensive corrosion. Downhole equipment such as sucker rods, pump rods, tubing and casing are generally made of mild steel which is adversely affected by the production fluid of the well. The often high temperatures and acidic nature of the production fluids and formation waters magnifies these corrosion problems. Additionally, oil or gas-conveying pipelines are also prone to corrosion.

A variety of anti-corrosion systems have been described in the past. Many corrosion inhibitors are aqueous dispersions containing a variety of components, e.g., 2-mercaptobenzothiozole, benzotriozole, tolyltriozole, phosphates, polyphosphates, organic soluble polymers, silicates, dithiocarbamates, nitrites, oxazoles, imidazoles, imidazolines, lignands, lignosulfates, tannins, phosphoric acid esters and boric acid esters. Many of these inhibitors are very prone to freezing during cold weather, making them very difficult to handle and maintain. Moreover, the useful life of many prior anti-corrosion treatments is very short, e.g., a week or less.

U.S. Pat. Nos. 5,936,059 and 5,945,164 describe highly useful anti-corrosion systems and methods particularly suited for oil and gas recovery and conveying equipment. The systems of the invention include an epoxy component as well as an amine curing agent component, which are either mixed together at the introduction site, or are simultaneously injected into a well or pipeline. A problem has arisen, however, when extremely long pipelines or deep wells require treatment. In such cases, the admixed epoxy and curing agent components tend to prematurely cure prior to application along the full length of the well or pipeline, meaning that certain portions of the equipment are not successfully treated. See also U.S. Pat. No. 4,526,813.

SUMMARY OF THE INVENTION

The present invention overcomes the problems outlined above and provides improved methods for anti-corrosion treatment of metallic surfaces in oil or gas recovery or conveying equipment. Broadly speaking, the methods of the invention comprise the steps of first providing an anti-corrosion system including separate quantities of a first component including an epoxy resin active ingredient in a first compatible dispersant, and a second component including a curing agent active ingredient for the epoxy resin in a second compatible dispersant. In treatment operations, the metallic surfaces are initially contacted with one of the first and second components, and the corresponding active ingredient is caused to at least partially coat the metallic surfaces. Next, a fluid separate from the first and second components is passed over the at least partially coated metallic surfaces. After these initial contacting and fluid-passing steps, the at least partially coated metallic surfaces are subsequently contacted with the other of the first and second components, and the active ingredients of the first and second components react with each other and generate an anti-corrosion layer.

In preferred practice, the epoxy-containing component is initially contacted with the metallic surfaces, followed by the curing agent component. Generally, both the epoxy and curing agent are dispersed at levels of about 10-50% by volume in compatible (i.e., non-interfering) dispersants selected from a group consisting of benzene, xylene, toluene, naptha, alcohol (preferably the C1-C5 alcohols and most preferably isopropanol), and mixtures thereof. The fluid passing over the metallic surfaces between the system components is generally the hydrocarbon fluid being recovered or conveyed, e.g., oil or gas, and can include process water. A period of time should elapse between the initial and subsequent contacting steps. This time should be at least about 30 seconds, and can range for a period of from about 30 seconds-4 hours.

In the context of a long oil or gas pipeline, it is preferred that a series of shiftable pigs be placed within the pipeline and move by the flowing oil or gas. A quantity of a first system component is injected into the pipeline between first and second pigs, while a quantity of the second component is injected between trailing third and fourth pigs. The conveyed hydrocarbon is between the second and third pigs. Thus, as the pigs are moved along the pipeline, the first component is applied as a layer along the inner metallic surface of the pipeline, and thereafter the second component is applied to cause the first and second components to cure and thereby form an effective anti-corrosion layer. The similar sequential application of system components is preferably carried out in oil or gas wells to achieve a similar end.

DETAILED DESCRIPTION OF THE PREFERRED EMBODIMENT

The Anti-Corrosion System of the Invention

Figure 1:
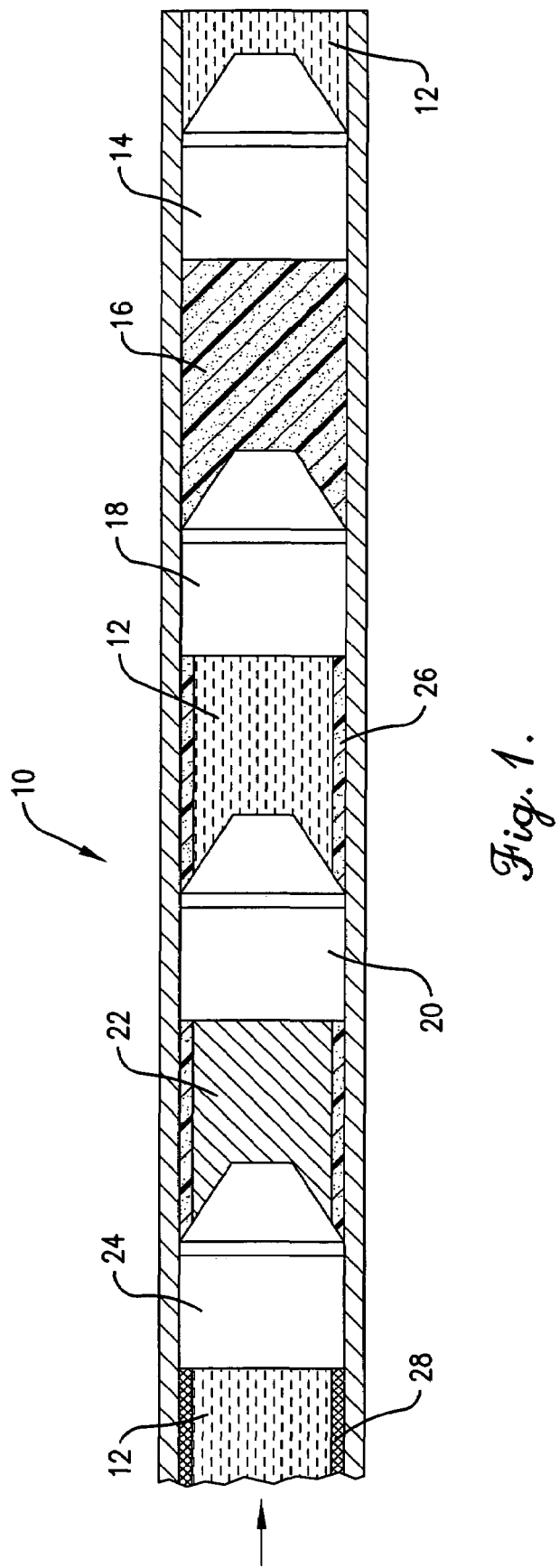
FIG. 1 is a schematic representation of steps involved in the anti-corrosion treatment of an oil or gas pipeline in accordance with the invention.

A variety of epoxies can be used in the invention. Generally, any epoxy resin having, on the average, more than one vicinal epoxy group per molecule can be used in the composition and process of the invention. The epoxy resin may be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing a hydroxyl group (e.g., bisphenol A) carried out under alkaline reaction conditions. Other suitable epoxy resins can be prepared by the reaction of epichlorohydrin which mononuclear di- and tri-hydroxy phenolic compounds such as resorcinol and phloroglucinol, selected polynuclear polyhydroxy phenolic compounds such as bis(p-hydroxyphenyl) methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 1500 to about 2000. The commercially available Epon 828 epoxy resin, a reaction product of epichlorohydrin and 2,2-bis(4-hydroxyphenyl)propane(bisphenol A) and having a molecular weight of about 400, an epoxide equivalent (ASTM D-1652) of about 185-192, is presently preferred.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like, with unsaturated alcohols.

In addition to the foregoing, it is contemplated that suitable polyepoxides can be derived from esters prepared from unsaturated alcohols and unsaturated carboxylic acids. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate and the like.

Other unsaturated materials which can be epoxidized to give resins suitable for use include butadiene based polymers such as butadiene-styrene copolymers, polyesters available as derivatives of polyols such as ethylene glycol with unsaturated acid anhydrides such as maleic anhydride and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use.

The alkoxylated amine curing agents useful in the invention may be aliphatic, cycloaliphatic, aromatic or heterocyclic. Particularly preferred are the alkoxylated polyamines, especially the alkoxylated N-alkyl- and N-alkylenyl-substituted 1,3-diaminopropanes and mixtures thereof. Examples of such alkoxylated polyamines include alkoxylated N-hexadecyl-1,3-diaminopropane, N-tetradecyl-1,3-diaminopropane, N-octadecyl-1,3-diaminopropane, -pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of ethoxylated-alkylated and N-alkenylated diamines can be used in the invention. The presently preferred polyamine is a commercial product, ethoxylated-tallow-1,3-diaminopropane, where the degree of ethoxylation is approximately 10 moles ethoxylate per mole of tallow diamine.

Various imidazoline derivatives can be employed in the invention as curing agents, and the most preferred derivatives are set forth in the following structural formula:

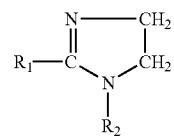

wherein $R_1$ is hydrogen or an alkyl group having up to 18 carbon atoms therein, and $R_2$ is hydrogen or an alkyl or amine group having up to 18 carbon atoms therein.

The presently most preferred anti-corrosion coating system is made up of a first component including 25% by volume epoxy dispersed in heavy aromatic naphtha, and a second component including 25% by volume ethoxylated tallow-1,3-propylene diamine dispersed in heavy aromatic naphtha having about 2-15 moles of ethoxylate per mole of tallow diamine. These two components are separate and are used separately in the invention. However, when so used, the resulting anti-corrosion coating generally has curing agent:epoxy volumetric ratio of from about 1:1-6:1, and more preferably 3:1.

The Preferred Treating Methods

As indicated previously, it has been found that the separate components of the treating system can be advantageously used in sequence, in order to provide anti-corrosion coatings over substantial lengths of equipment, while avoiding the problems of premature curing sometimes encountered in prior art techniques. The preferred methods of the invention can best be understood from a consideration of the drawing figures and the following explanations.

Referring first to FIG. 1, a conventional oil or gas pipeline 10 is depicted which normally conveys fluid hydrocarbon 12. If it is desired to treat the interior surfaces of pipeline 10 in accordance with the invention, the following procedure is carried out. A first pig 14 is placed within the pipeline 10 through an upstream entrance port (not shown) and is transported therealong by the moving fluid. Next, one of the system components (preferably the first epoxy-containing component 16) is injected into the pipeline behind pig 14, and a second pig 18 is inserted behind the component 16. The fluid 12 is then allowed to pass for a selected period of time and a third pig 20 is inserted into the pipeline 10. Following this, the remaining component (preferably the second curing agent-containing component 22) is injected and a final pig 24 is inserted. As seen in FIG. 1, this sequential process creates a body or "plug" of the epoxy component 16 between pigs 14 and 18, pipeline fluid 12 between pigs 18 and 20, and a body or "plug" of curing agent 22 between the pigs 20 and 24. In addition, during travel of the components 16 and 22, a first coating 26 of the epoxy 16 is formed along the inner surface of pipeline 10. This coating 26 remains in place during passage of the fluid 12 between pigs 18 and 20. Finally, passage of the second component 22 along the pipeline causes the curing agent component to contact the epoxy component, leading to a final cured anti-corrosion layer 28. This procedure allows a cured layer 28 to be created along the entire length of pipeline 12, depending only upon the quantities of epoxy and curing agent injected into the pipeline.

In normal practice, the first and second components are used at an epoxy:curing agent volumetric ratio of about 1:3. In the case of a 4-inch pipeline, the total number of pints of the preferred anti-corrosion system (i.e., epoxy plus curing agent) is about 5.2 pints/mile. For pipelines ranging 2 inches-10 inches in diameter, the total number of pints ranges from about 2.6 to 13.8/mile. The final anti-corrosion layer should have a minimum thickness of about 1 mil, and more preferably from about 1-3 mils.

A number of other possibilities exist for treatment of an oil or gas pipeline 10. For example, respective, spaced-apart injection ports could be provided along the length of pipeline 10 for alternate injection of the first and second system components. Thus, the epoxy-containing first component could be injected into the pipeline 10 at an upstream location, whereas the second curing agent-containing component could be injected at an appropriate downstream location. Such a technique would afford many of the same advantages and avoid the need of using multiple pigs.

Figure 2:
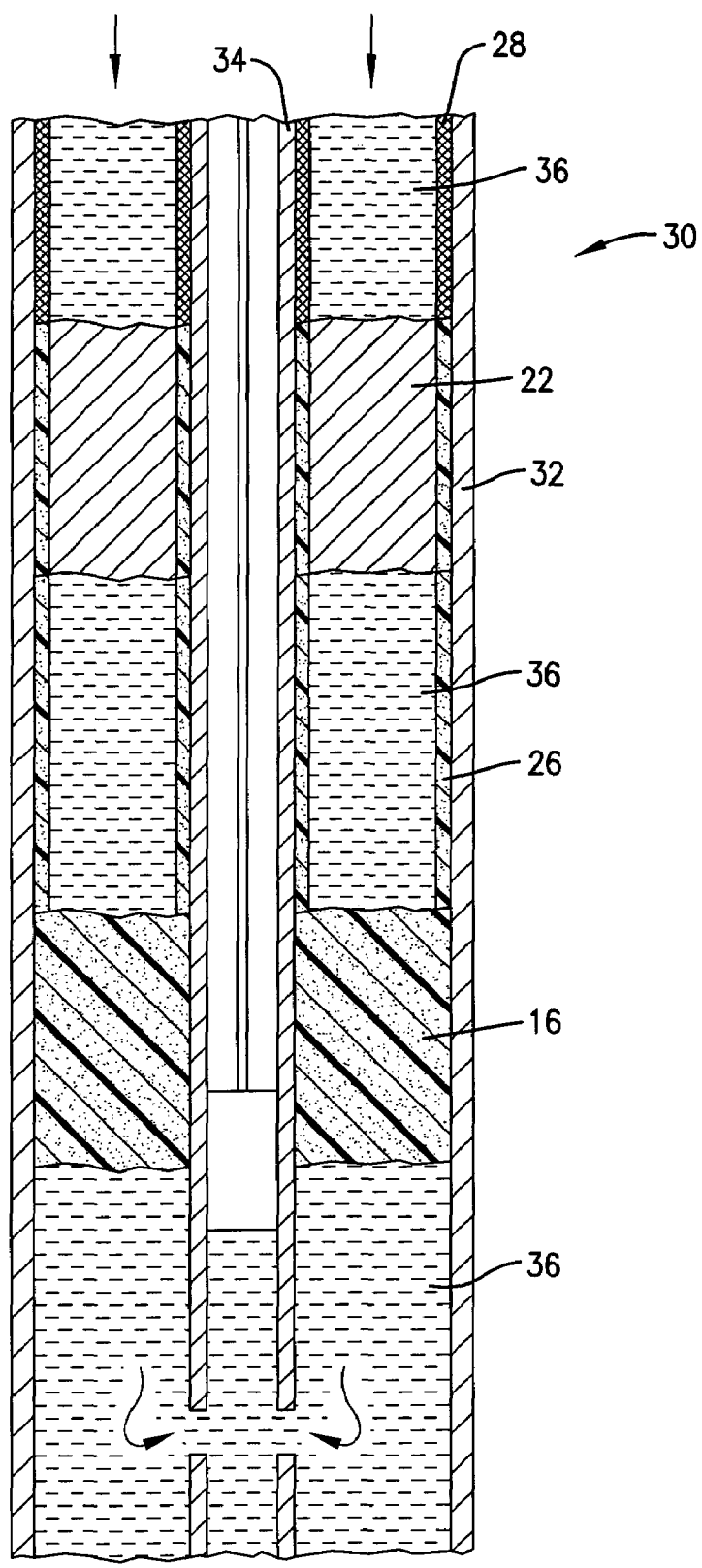
FIG. 2 is a schematic representation of a producing oil well and illustrating the steps involved in the anti-corrosion treatment of the well.

FIG. 2 depicts a conventional oil or gas well 30 having a metallic casing 32 as well as inner sucker rod casing 34. In order to provide an anti-corrosion coating on metallic surfaces within the well 30, the same stepwise procedure described above is employed. Thus, in the first step, the first epoxy component 16 is introduced into the well annulus as a body or "plug." Thereafter, a fluid 36 (e.g., oil, natural gas, process water, and mixtures thereof) is injected in order to drive the component 16 downwardly into the well. After a suitable time, the second component 22 is introduced into the well annulus, again creating a moving body or "plug." Finally, additional fluid 36 is applied in order to drive the component 22 downwardly. During passage of the component 16, an epoxy coating 26 is applied to the well component surfaces, and as the component 22 passes, the final cured anti-corrosion layer 28 is formed. Owing to the sequential introduction of the system components, the layer 28 is formed over substantially the entirety of the well component surfaces. The preferred thickness of anti-corrosion layer is the same as that used in pipelines.

EXAMPLE

In order to test the effectiveness of the sequential application of epoxy and curing agent components in accordance with the invention, the following procedure was carried out. First, 50 ml of oil well process water was treated with 1 ml of an epoxy component made up of 30% by volume Epon 828 epoxy in 70% by volume xylene. Next, a mild steel coupon was placed within the treated process water and allowed to stand for 5 minutes. The coupon was then removed from the treated process water and allowed to dry in air for 5 minutes. The dried coupon was then placed for 5 minutes in a second 50 ml volume of process water treated with 3 ml of an amine curing agent component made up of 30% by volume alkoxylated tallow amine in 70% by volume xylene. The sequentially treated coupon was then removed from the curing agent-treated process water and allowed to dry for 5 minutes.

The treated coupon was then immersed in a 2% copper sulfate solution, in accordance with Baroid Petroleum Services Copper Ion Test CI-2.9. After 30 seconds immersion, the coupon was removed from the sulfate solution and the coupon was inspected for copper color and deposition on the coupon surface. No discoloration was noted, thereby confirming that an effective anti-corrosion layer existed on the coupon

We claim:

1. A method of treating metallic surfaces of oil or gas recovery or conveying equipment, comprising the steps of:
providing an anti-corrosion system including separate quantities of a first component including an epoxy resin active ingredient in a first compatible dispersant, and a second component including a curing agent active ingredient for the epoxy resin in a second compatible dispersant;
initially contacting said metallic surfaces with one of said first and second components and causing the corresponding active ingredient to at least partially coat said metallic surfaces;
passing a fluid separate from said first and second components over said at least partially coated metallic surfaces, said fluid selected from the group consisting of oil, natural gas, process water, and mixtures thereof; and
after said initial contacting and fluid-passing steps, subsequently contacting said at least partially coated metallic surfaces with the other of said first and second components, and causing the active ingredients of said components to react with each other and generate an anti-corrosion layer.

2. The method of claim 1, including the step of initially contacting said metallic surfaces with said first component, and thereafter contacting the at least partially coated metallic surfaces with said second component.

3. The method of claim 1, said first and second dispersants being the same.

4. The method of claim 3, said first and second dispersants each being selected from the group consisting of benzene, xylene, toluene, naptha, alcohol, and mixtures thereof.

5. The method of claim 4, said first and second dispersants each being aromatic naptha.

6. The method of claim 1, said first component including from about 10-50% by volume epoxy.

7. The method of claim 1, said second component including from about 10-50% by volume curing agent.

8. The method of claim 1, said first and second components being individually injected into said equipment.

9. The method of claim 1, said curing agent selected from the group consisting of alkoxylated amines, imidazolines, and mixtures thereof.

10. The method of claim 9, said curing agent comprising an alkoxylated tallow amine having from about 2-15 moles of alkoxylate per mole of tallow amine.

11. The method of claim 1, there being a period of at least about 30 seconds between said contacting steps.

12. The method of claim 11, said period being from about 30 seconds-4 hours.

13. The method of claim 1, said equipment comprising an oil or gas pipeline, and said method further comprising the steps of:
placing a first shiftable pig within said pipeline;
performing said initial contacting step;
placing a second shiftable pig within said pipeline, with said first component located between the first and second pigs;
allowing oil or gas within said pipeline to pass behind said second pig;
placing a third shiftable pig in said pipeline, with said oil or gas between said second and third pigs;
performing said subsequent contacting step; and
placing a fourth shiftable pig in said pipeline, with said second component between the third and fourth pigs.

14. The method of claim 1, said equipment comprising an operating oil or gas well, said method comprising the steps of:
initially injecting said first component into the casing of said well;
driving said first component downwardly within said well casing by injection of said fluid behind said first component;

thereafter injecting said second component into said well casing; and driving said second component downwardly within said well casing by injection of additional fluid behind said second component.

15. A method of treating metallic surfaces of an oil or gas pipeline, comprising the steps of:
providing an anti-corrosion system including separate quantities of a first component including an epoxy resin active ingredient in a first compatible dispersant, and a second component including a curing agent active ingredient for the epoxy resin in a second compatible dispersant;
initially contacting said metallic surfaces with one of said first and second components and causing the corresponding active ingredient to at least partially coat said metallic surfaces;
passing a fluid separate from said first and second components over said at least partially coated metallic surfaces; and
after said initial contacting and fluid-passing steps, subsequently contacting said at least partially coated metallic surfaces with the other of said first and second components, and causing the active ingredients of said components to react with each other and generate an anti-corrosion layer,
said method further comprising the steps of
placing a first shiftable pig within said pipeline;
performing said initial contacting step;
placing a second shiftable pig within said pipeline, with said first component located between the first and second pigs;
allowing oil or gas within said pipeline to pass behind said second pig;
placing a third shiftable pig in said pipeline, with said oil or gas between said second and third pigs;
performing said subsequent contacting step; and
placing a fourth shiftable pig in said pipeline, with said second component between the third and fourth pigs.

16. A method of treating metallic surfaces of oil or gas recovery or conveying equipment during use of the equipment or recovery or conveying oil or gas, comprising the steps of:
providing an anti-corrosion system including separate quantities of a first component including an epoxy resin active ingredient in a first compatible dispersant, and a second component including a curing agent active ingredient for the epoxy resin in a second compatible dispersant;
initially contacting said metallic surfaces with one of said first and second components and causing the corresponding active ingredient to at least partially coat said metallic surfaces;
passing a fluid separate from said first and second components over said at least partially coated metallic surfaces; and
after said initial contacting and fluid-passing steps, subsequently contacting said at least partially coated metallic surfaces with the other of said first and second components, and causing the active ingredients of said components to react with each other and generate an anti-corrosion layer,
said initial contacting, fluid-passing and subsequent contacting steps being carried out during use of said equipment when oil or gas is being recovered or conveyed.

17. The method of claim 16, including the step of initially contacting said metallic surfaces with said first component, and thereafter contacting the at least partially coated metallic surfaces with said second component.

18. The method of claim 16, said first and second dispersants being the same.

19. The method of claim 18, said first and second dispersants each being selected from the group consisting of benzene, xylene, toluene, naptha, alcohol, and mixtures thereof.

20. The method of claim 19, said first and second dispersants each being aromatic naptha.

21. The method of claim 16, said first component including from about 10-50% by volume epoxy.

22. The method of claim 16, said second component including from about 10-50% by volume curing agent.

23. The method of claim 16, said first and second components being individually injected into said equipment.

24. The method of claim 16, said curing agent selected from the group consisting of alkoxylated amines, imidazolines, and mixtures thereof.

25. The method of claim 24, said curing agent comprising an alkoxylated tallow amine having from about 2-15 moles of alkoxylate per mole of tallow amine.

26. The method of claim 16, said fluid selected from the group consisting of oil, natural gas, process water, and mixtures thereof.

27. The method of claim 16, there being a period of at least about 30 seconds between said contacting steps.

28. The method of claim 27, said period being from about 30 seconds-4 hours.

29. The method of claim 16, said equipment comprising an oil or gas pipeline, and said method further comprising the steps of:
placing a first shiftable pig within said pipeline;
performing said initial contacting step;
placing a second shiftable pig within said pipeline, with said first component located between the first and second pigs;
allowing oil or gas within said pipeline to pass behind said second pig;
placing a third shiftable pig in said pipeline, with said oil or gas between said second and third pigs;
performing said subsequent contacting step; and
placing a fourth shiftable pig in said pipeline, with said second component between the third and fourth pigs.

30. The method of claim 16, said equipment comprising an operating oil or gas well, said method comprising the steps of:
initially injecting said first component into the casing of said well;
driving said first component downwardly within said well casing by injection of said fluid behind said first component;
thereafter injecting said second component into said well casing; and
driving said second component downwardly within said well casing by injection of additional fluid behind said second component.

* * * * *